United States Patent [19]

Southward et al.

[11] Patent Number: 5,551,650
[45] Date of Patent: Sep. 3, 1996

[54] ACTIVE MOUNTS FOR AIRCRAFT ENGINES

[75] Inventors: Steve C. Southward; Douglas E. Ivers, both of Cary, N.C.

[73] Assignee: Lord Corporation, Erie, Pa.

[21] Appl. No.: 260,945

[22] Filed: Jun. 16, 1994

[51] Int. Cl.$^6$ .................................................. B64D 27/00
[52] U.S. Cl. ......................... 244/54; 244/17.27; 244/1 N; 267/140.15
[58] Field of Search .................................. 244/54, 17.27, 244/1 N; 267/140.14, 140.15

[56] References Cited

U.S. PATENT DOCUMENTS

| | | | |
|---|---|---|---|
| 2,241,408 | 5/1941 | Lord | 248/5 |
| 2,812,032 | 11/1957 | Kock | 181/5 |
| 3,303,335 | 2/1967 | Pryor | 235/181 |
| 3,836,100 | 9/1974 | Von Hardenberg et al. | 244/54 |
| 4,025,724 | 5/1977 | Davidson, Jr. et al. | 179/1 P |
| 4,488,240 | 12/1984 | Kapadia et al. | 364/508 |
| 4,689,821 | 8/1987 | Salikuddin et al. | 381/71 |
| 4,715,559 | 12/1987 | Fuller | 244/1 N |
| 4,947,356 | 8/1990 | Elliott et al. | 244/1 N |
| 5,052,529 | 10/1991 | Sutcliffe et al. | |
| 5,135,079 | 8/1992 | Shimazaki | 187/1 R |
| 5,197,692 | 3/1993 | Jones et al. | 244/54 |
| 5,216,722 | 6/1993 | Popovich | 381/71 |
| 5,219,037 | 6/1993 | Smith et al. | 267/140.14 |
| 5,221,185 | 6/1993 | Pla et al. | 244/1 N |
| 5,224,168 | 6/1993 | Martinez et al. | 381/71 |
| 5,226,016 | 7/1993 | Christman | 367/135 |
| 5,229,556 | 7/1993 | Geddes | 181/206 |
| 5,251,262 | 10/1993 | Suzuki et al. | 381/71 |
| 5,310,137 | 5/1994 | Zoerkie, Jr. et al. | 244/17.27 |

FOREIGN PATENT DOCUMENTS

| | | | |
|---|---|---|---|
| 0621418A2 | 8/1993 | European Pat. Off. | F16F 13/00 |
| 2132053 | 12/1982 | United Kingdom | G10K 11/16 |

OTHER PUBLICATIONS

Lyubashevskii et al., Adaptive Cancellation of the Discrete Components of Noise, 1992 May–Jun.

*Primary Examiner*—Andres Kashnikow
*Assistant Examiner*—Tien Dinh
*Attorney, Agent, or Firm*—Richard K. Thomson; Randall S. Wayland; James W. Wright

[57] ABSTRACT

An active mount for fixed wing applications. One aspect of the invention provides decoupling of two tones which are close in frequency by positioning the mount actuators and error sensors in the primary transmission path of the disturbance vibration and by providing adequate spatial separation between the two sets of error sensors to reduce or eliminate cross-coupling of the signals. Another aspect of the invention utilizes orthogonally positioned actuators with corresponding actuators of paired mounts being focalized for each engine.

11 Claims, 2 Drawing Sheets

ACTIVE MOUNTS FOR AIRCRAFT ENGINES

BACKGROUND AND SUMMARY OF THE INVENTION

This invention relates to the area of active vibration control. Specifically, the invention relates to improvements in active mounts for fixed wing applications. More specifically, this invention is directed to a system for cancelling two tones which are relatively close in frequency, as in the case of the primary (and/or secondary) disturbance frequencies of pairs of turbofan or turboprop engines.

In the realm of active noise and vibration control, there are three implementation approaches: active noise control, which uses an inverse-phase sound wave to cancel the disturbance signal; active structural control, which vibrates a structural component at a frequency to cancel the input disturbance (noise and/or vibration); and active isolation control, where an actuator in a mount is reciprocated at the proper frequency, phase and amplitude to cancel the input disturbance (which, again, may be a structural vibration or in the audible range, in which case it is experienced as noise). The decoupling feature of the present invention can be utilized with each of these three implementation approaches.

Active mounts for controlling vibrational input from an engine to the support structure are known. For example, commonly assigned U.S. Pat. No. 5,174,522 issued to Hodgson teaches the use of an active fluid mount for vibration cancellation. Systems which actively control vibration or sound by using an out of phase cancellation signal are also known and include U.S. Pat. Nos. 4,677,676 to Eriksson, 4,153,815 to Chaplin, 4,122,303 to Chaplin et al., 4,232,381 to Rennick et al., 4,083,433 to Geohegan, Jr. et al., 4,878,188 to Zeigler, Jr., 4,562,589 to Warnaka et al., 4,473,906 to Warnaka et al., 5,170,433 to Elliott, 4,689,821 to Salikudden et al., and 5,133,527 to Chen et al. These systems utilize digital microprocessors (processors) to control or minimize mechanical vibration or ambient noise levels at a defined location or locations, as for example noise or vibration experienced in an aircraft cabin or within an automobile passenger compartment. Generally, these systems are responsive to at least one external input signal such as a synchronizing tachometer signal and/or error signal as supplied by various types of sensors such as microphones, accelerometers, etc. These systems strive to reduce to zero, or at least minimize, the recurring sound and/or vibration.

Multiple-input, multiple-output (MIMO) systems are required to adequately compensate for the vibrations of plural turbofan or turboprop engines. In active control systems of the above-mentioned type, it is generally required to have an input signal for each tone to be canceled which is supplied to an adaptive filter and/or a processor which is indicative of the frequency content and/or amplitude/phase of the input source, i.e., indicative of the disturbance signal. Particularly, it is usually required to have two or more analog or digital waveforms, such as a sine and cosine wave, that are synchronized with (at the same frequency as) the input source signal for providing the appropriate information to the processor and/or adaptive filter. These waveforms will be utilized in computing the appropriate frequency and amplitude of a cancellation signal in accordance with a particular algorithm such as least mean square (LMS) and filtered-x LMS algorithms.

Many such algorithms have difficulty processing two tones which are close in frequency such as in the case of a right engine operating at a first frequency $N_{1R}$ and a left engine operating at a second frequency $N_{1L}$ which is the same or nearly the same as the first frequency. Turbofan and turboprop engines typically have four tones that are objectionable: $N_{1R}$ which corresponds to the frequency of the right fan or prop, $N'_{1L}$ which corresponds to the frequency of the right turbine, $N_{1L}$ which corresponds to the left engine fan or prop and $N'_{1L}$ which corresponds to the left engine turbine frequency. These similar tones ($N_{1R}$ and $N_{1L}$ or $N'_{1R}$ and $N'_{1L}$) can cyclicly reinforce one another creating a particularly objectionable beat frequency. The relative closeness of the two tones can cause the system to become unstable as the algorithm seeks to find an optimal cancellation solution.

In practice, each of the error sensors of such a system will pick up all four of the engine disturbance frequencies, to some degree. The most general controller objective is for each actuator to provide a cancellation force at each of the four tones. The controller would provide a signal segment of sufficient amplitude and phase inverted to cancel each of the individual four components, then superpose the four signal segments into a single cancellation signal (complex sine wave) to be fed to the actuator. When any two of the four tones are relatively close in frequency (and generally there are two pairs of such tones), the control algorithm can have difficulty converging to a stable set of actuator signals.

The present invention provides decoupling of the response to the two tones having similar/identical frequencies by proper positioning of the sensors and the actuators. Preferably, both the sensors and actuators can be placed in the primary disturbance path between the power plant (or engine) and the support structure. (In the case of active isolation control, the actuator will necessarily be in the primary disturbance path. In the case of active noise cancellation, the microphones will not be in the primary disturbance path.) In addition, the error sensors must be widely spaced enough to prevent cross-coupling of the closely spaced frequencies ($N_{1R}$ and $N_{1L}$, for example). By spatially separating the error sensors, the magnitude of the signal $N_{1L}$ detected by the sensors positioned to monitor the $N_{1R}$ signal and visa versa, will be small enough that it can be ignored (i.e., will be at least an order of magnitude smaller) or may be filtered out by the signal conditioner.

In another aspect of the invention, pairs of sets of force transmission elements within the active mount are positioned such that each element can transmit a vertical force component and a horizontal force component. Further, one of the force transmission elements from each of the mounts is targeted to focalize its cancellation force (i.e., the elastic center, the point at which the axes of force intersect, is at or beyond the center of gravity of the power plant). Focalization is well known in the mounting art, and is more particularly described in U.S. Pat. Nos. 2,175,999 issued to Taylor and 2,241,408 issued to Lord which are hereby incorporated by reference. Preferably, the two force transmission elements are orthogonally oriented. Further, in one embodiment, each transmission element is preferably oriented at a 45° angle to the horizontal. In a second alternative embodiment, the orthogonal actuators may be arranged to act along horizontal and vertical axes, respectively. The actuators may be tuned absorbers, electromagnetic, electrohydraulic or piezoelectric.

Various other features, advantages and characteristics of the present invention will become apparent after a reading of the following specification.

DETAILED DESCRIPTION OF THE PREFERRED EMBODIMENTS

Figure 1:
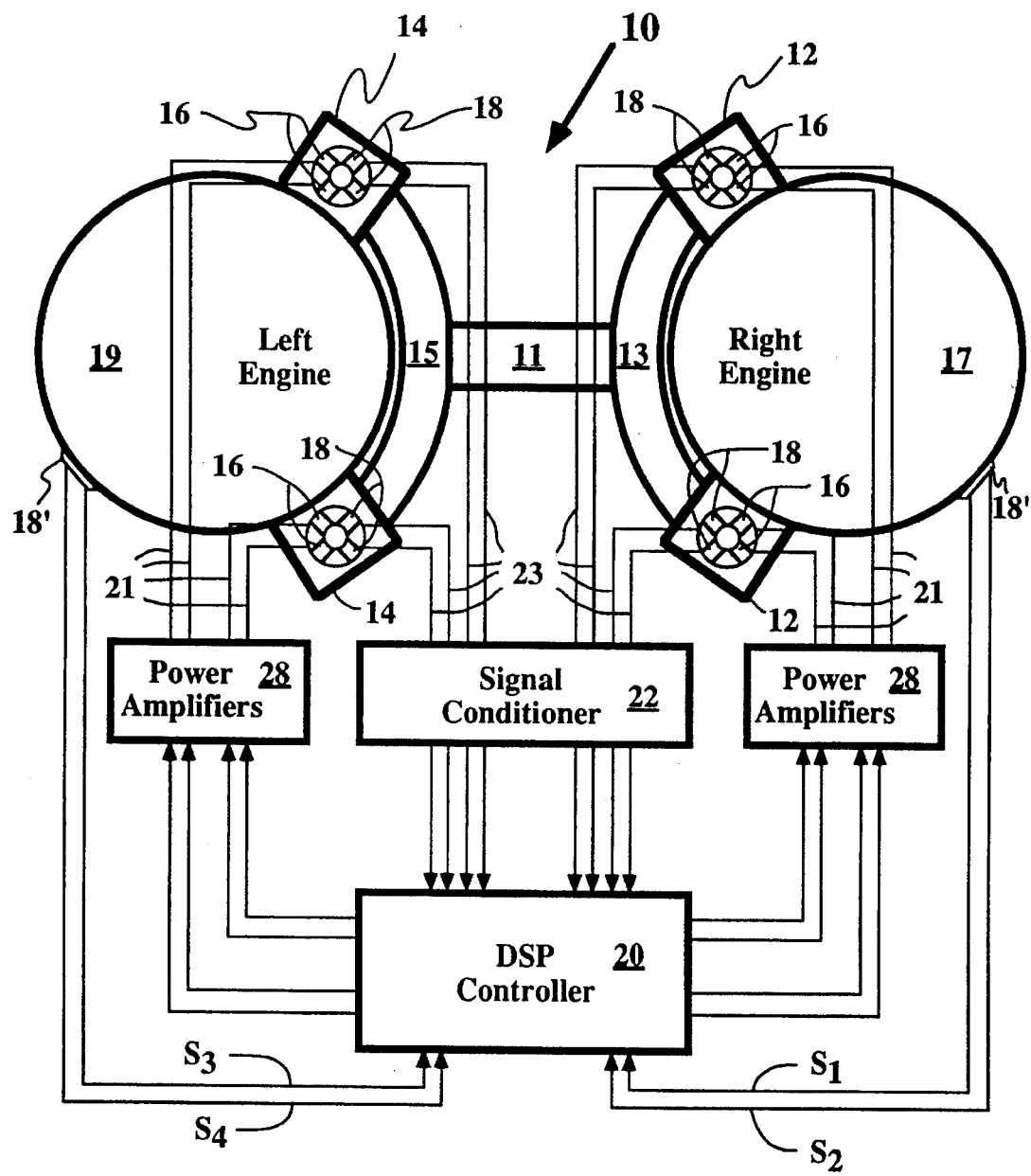
FIG. 1 is a schematic depiction of the electrical interconnection of the various system components.

The cancellation system of the present invention is depicted in FIG. 1 generally at 10. While the invention is shown in FIG. 1 implemented with an active isolation control system, it will be appreciated that the invention may also be used in active structural control and active noise control systems, as well. The active isolation control system may utilize a waveform generator of the type described in commonly assigned U.S. patent application Ser. No. 08/245,719 filed May 18, 1994 entitled "Waveform Generator" to produce the sync signals $S_1$, $S_2$, $S_3$, and $S_4$, which application is hereby incorporated by reference. Further, the system may utilize as its digital signal processing controller 20 the feedforward control processor of U.S. patent application Ser. No. 08/245,717 filed May 18, 1994, which application is hereby incorporated by reference. Engine support beam 11 extends through a portion of the fuselage of a fixed-wing aircraft (not shown) and interconnects first (13) and second (15) crescent-shaped support arms. At the extremities of support arms 13, 15 are pairs of active mounts 12 and 14. Active mounts 12 support right engine 17 and active mounts 14 support left engine 19. Each mount includes a pair of actuators or force transmission elements 16 orthogonally positioned between the engine and the airframe or exclusively positioned on the structural support side of the mount (FIG. 3) and two or more sensors 18 on the structure side of the mount. Active mounts 12, 14 may be either the front or rear mounts of the engine with a more conventional passive mount being utilized at the alternate location.

At least one reference signal is needed, with two sync signals $S_1$, $S_2$ being shown. These sync signals are transmitted from the right engine 17 to controller 20 and two sync signals $S_3$, $S_4$ from left engine 19. Signals $S_1$, $S_2$ are representative of the frequency, and phase of $N_{1R}$ and $N_{2R}$ of the right engine 17, while $S_3$, $S_4$ are representative of the frequency and phase of $N_{1L}$ and $N_{2L}$ of left engine 19. These sync signals may be provided by a tachometer, accelerometer, magnetic pickup or other sensor associated with the shaft of the turbine, or the like as indicated in FIG. 1 at 18'. It will be remembered that when the term "tachometer" is used herein, it is used representatively of other similar sensors. Adaptive filters within controller 20 provide weighting factors which are computed in accordance with a preferred algorithm (usually LMS or filtered-x LMS) and phase timing to controller signals 21 which are fed to force transmission elements 16 upper and lower mounts 14 through amplifiers 28 to cancel or minimize transmission of the $N_{1R}$, $N_{2R}$, $N_{1L}$ and $N_{2L}$ vibration tones. Sensors 18 feedback the error signals 23 to the controller 20 through signal conditioner 22 to initiate correction to the calculations of the amplitude computed by the algorithm as well as the phase shift to effect minimization.

As mentioned earlier, the normal control theory involves each error sensor 18 detecting some amount of each objectionable tone and each actuator 16 receiving a controller signal 21 which attempts to fully cancel the tones received. If any two of the disturbance tones are close in frequency, many algorithms are unable to produce a stable control signal for cancellation. The present solution proposes positioning both the actuators 16 and the error sensors 18 in the primary disturbance path between the engines 17, 19 and the support structure 13, 15. Further, the sensors of right engine mounts 12 must be adequately separated from left engine mounts 14 that cross coupling of the tones does not occur (i.e., the component of the right engine tones $N_{1R}$ and $N'_{1R}$ received at the left engine mount 14 will be at least an order of magnitude smaller than those received from the left engine 19 and can be disregarded). By this positioning, the system achieves both tonal decoupling (i.e., the left side actuators of mounts 14 will only attempt to control the tones $N_{1L}$ and $N'_{1L}$, while the actuators of the right mounts 12 will only attempt to control the $N_{1R}$ and $N'_{1R}$ tones), and sensor decoupling (sensors of right engine mounts 12 will only stimulate actuators of right engine mounts 12, while the sensors of left engine mounts 14 will stimulate actuators 16 of left engine mounts 14). This decoupling of the response to tones which are relatively close in frequency (such as $N_{1R}$ and $N_{1L}$ as well as $N'_{1R}$ and $N'_{1L}$) overcomes the stability problems which occur with algorithms such as LMS and filtered-x LMS.

The force transmission elements (actuators) 16 are orthogonally positioned and may each form a 45° angle with the horizontal as depicted in FIG. 1. This has some advantages in that each actuator 16 is able to deliver equal amounts of vertical and horizontal cancelling vibrations. In an alternative embodiment, one actuator may be positioned to deliver force radially and the second tangentially with respect to the engine. In yet a third embodiment, actuators 16 may be positioned such that the first extends along a horizontal axis and the second along a vertical axis (the upper mounts 12, 14 would have actuators extending downwardly with the lower mounts having actuators extending upwardly). In any event, it is desired that the lines of force along which two of the actuators 16 operate be focalized. That is, that the lines of force intersect at the center of gravity of their respective engine or beyond (as measured from the actuators). By focalizing the mounts, the mounts can be made soft tangentially, and comparatively rigid radially, and still support the engine. Since the mount is soft tangentially, little if any force will be transmitted in the tangential direction and the number of actuators required for tangential force cancellation can be significantly reduced and, in some cases, tangential actuators can be eliminated.

Figure 2:
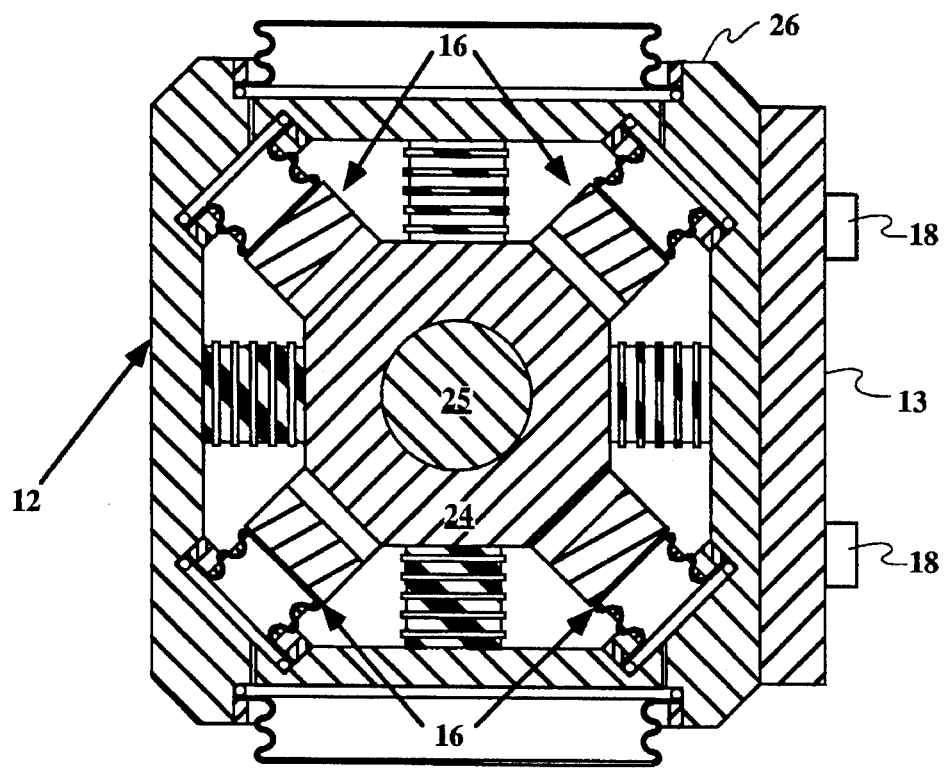
FIG. 2 is a cross-sectional end view of one embodiment of active mount useful in the cancellation system of the present invention.
Figure 3:
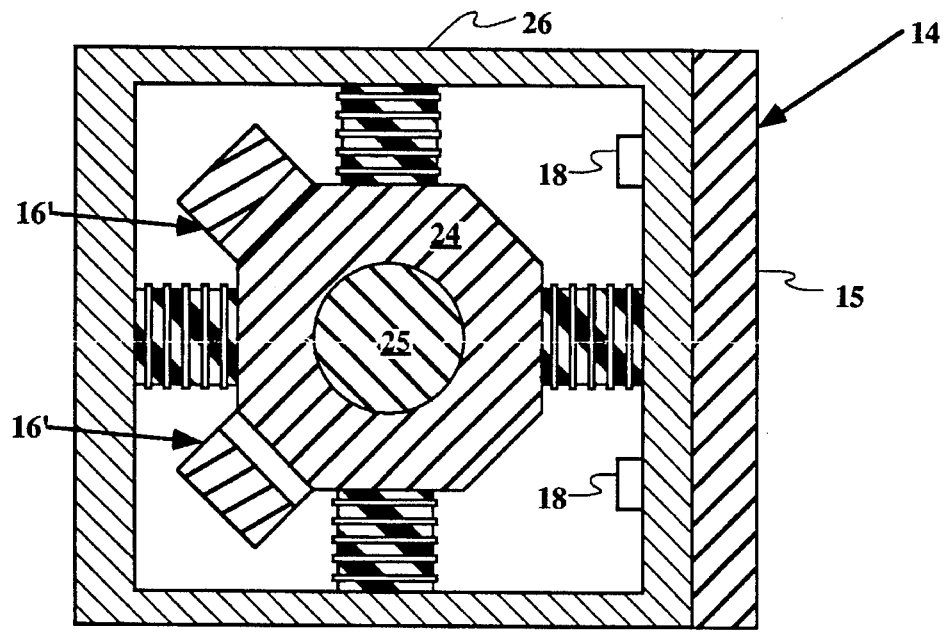
FIG. 3 is a cross-sectional end view of a second embodiment of active mount useful in the cancellation system of the present invention.

The active mounts 12, 14 may be of the type described in FIG. 9 of U.S. patent application Ser. No. 08/145,430 filed Oct. 29, 1993, which is hereby incorporated by reference. As seen in FIG. 2, mount 12 (which is equivalent of mount 14) has four orthogonally positioned actuators 16. Four actuators are required for those actuator types which only have capacity for force in one direction. For other actuators, only two units are needed as shown in FIG. 3. Center frame 24 surrounds pylon 25 while outer frame 26 houses the mount. One of the pylon 25 and outer frame 26 are attached to supports 13, 15 while the other is attached to its respective engine 17, 19. Generally, center frame 24 will be connected to the supports and the outer frame to the engines 17, 19. However, FIGS. 2 and 3 show the center frame connected to the engine and the outer frame 26 to the supports 13, 15. Error sensors 18 may be positioned anywhere on the airframe side of the mount and are shown here attached to the exterior of center frame 24. The FIG. 2 embodiment depicts the actuators as electrohydraulic; however, they may alternatively be electromagnetic or piezoelectric or replaced by a speaker without departing from the invention.

FIG. 3 depicts yet another embodiment of mount 14 in which the actuators take the form of tuned absorbers 16'. The absorber are shown here on the engine side mounted on center frame 24. These orthogonal, focalized absorbers reduce vibration transmitted across mount 14 to the outer frame 26 and, hence to the supports 13, 15. These active absorbers 16' can be vibrated at any frequency but are tuned to deliver the most force at one particular frequency, usually $N_{1R}$ and $N_{1L}$.

By the present invention, the response to two tones which are relatively close in frequency are decoupled enabling the controller to compute and transmit cancellation signals which will effectively minimize the transmission of these signals, be they structural vibration or audible tones experienced as noise. While these embodiments have been described in terms of an active mount, the decoupling features of the present invention are equally applicable to active structural control and active noise control systems as well. In this regard, the actuators may be replaced by other output devices such as speakers for active noise control applications. Another feature of the present invention is the orthogonal positioning of the actuators within the mount with the focalization of the lines of force in order to reduce the number of tangential actuators required.

Various modifications, alternatives and changes will become apparent to one of ordinary skill in the art following a reading of the foregoing specification. It is intended that all such modifications, alternatives and changes as fall within the scope of the appended claims be considered part of the present invention.

What is claimed is:

1. A system for minimizing vibration transmitted from a plurality of power plants, including a first power plant operating at a frequency $N_{1R}$ and a second power plant operating at a frequency $N_{1L}$, where $N_{1R}$ and $N_{1L}$ are equal or nearly equal, into a passenger compartment of an aircraft, said system comprising
   a) a first active mount securing a first of said power plants to a first portion of an aircraft structure, said first active mount including first actuator means;
   b) a second active mount securing a second of said power plants to a second portion of said aircraft structure, said second active mount including second actuator means;
   c) first sensor means mounted proximate said first power plant for detecting vibration induced by said first power plant and for producing a first signal representative thereof, said first sensor means being spaced sufficiently far away from said second power plant to minimize an influence of $N_{1L}$ on said first signal;
   d) second sensor means mounted proximate s aid second power plant for detecting vibration induced by said second power plant and for producing a second signal representative thereof, said second sensor means being spaced sufficiently far away from said first power plant to minimize an influence of $N_{1R}$ on said second signal;
   e) signal processing means for converting said first and second representative signals into first and second control signals for said first and second actuator means of said first and second active mounts, respectively;
whereby said first and second sensor means are positioned so as to decouple the response of said actuators to their respective first and second representative signals.

2. The system for minimizing vibration of claim 1 wherein said first and second portions of said aircraft structure to which said power plants are secured are positioned on opposite sides of said passenger compartment.

3. The system for minimizing vibration of claim 1 wherein said first and second sensor means each comprise a tachometer providing first and second input signals representative of $N_{1R}$ and $N_{1L}$, respectively, and error sensor means representative of a level of vibration transmitted through said mount.

4. The system for minimizing vibration of claim 3 wherein said first and second error sensor means are positioned on the structure side of said mounts for said first and second power plants, respectively.

5. The system for minimizing vibration of claim 4 wherein said error sensor means are mounted in a primary disturbance path between said power plant and said support structure for its respective power plant.

6. The system for minimizing vibration of claim 5 wherein said first and second sensor means are capable of sensing frequency, phase and amplitude of said vibrations.

7. The system for minimizing vibration of claim 3 comprising a tonal control system in which said first tachometer detects a first operating frequency $N_{1R}$ of said first power plant and produces a signal representative of $N_{1R}$ and said second tachometer detects a second operating frequency $N_{1L}$ of said second power plant and produces a signal representative of $N_{1L}$.

8. The system for minimizing vibration of claim 7 wherein said first and second control signals are phase shifted signals whose amplitude has been modified which are also representative of $N_{1R}$ and $N_{1L}$ input to said first and second actuator means, respectively, to cancel the vibrational effects of $N_{1R}$ and $N_{1L}$.

9. The system for minimizing vibration of claim 8 wherein said actuator means comprises first and second orthogonal force transmission elements which are mounted such that each may deliver a force having a horizontal and a vertical component.

10. The system for minimizing vibration of claim 3 wherein said first and second power plants each produce a secondary disturbance tone $N'_{1R}$ and $N'_{1L}$, respectively, and said system includes means to minimize transmission of vibration resulting from these secondary disturbance tones including third and fourth input signals provided by a tachometer.

11. A system for minimizing vibration transmitted from a plurality of power plants, including a first power plant operating at a frequency $N_{1R}$ and a second power plant operating at a frequency $N_{1L}$, where $N_{1R}$ and $N_{1L}$ are equal or nearly equal, into a passenger compartment of an aircraft, said system comprising
   a) a first sync signal generating means for producing a signal representative of disturbance signal $N_{1R}$;
   b) a second sync signal generating means for producing a signal representative of disturbance signal $N_{1L}$;
   c) first error sensor means mounted proximate said first power plant on a structural support for detecting vibration induced by said first power plant in said support and for producing a first signal representative thereof, said first error sensor means being spaced a sufficient distance from said second power plant so that the influence of $N_{1L}$ on said first signal is minimal;
   d) second error sensor means mounted proximate said second power plant on a structural support for detecting vibration induced by said second power plant in said support and for producing a second signal representative thereof, said second error sensor means being spaced a sufficient distance from said first power plant so that the influence of $N_{1R}$ on said second signal is minimal;

e) a first output device for producing a counter-phased vibration to minimize the transmission of $N_{1R}$ to its respective support structure;

f) a second output device for producing a counter-phased vibration to minimize the transmission of $N_{1L}$ to its respective support structure;

g) signal processing means for receiving said first and second sync signals and said first and second representative signals and producing first and second control signals for said first and second output devices, respectively;

whereby said first and second error sensor means are positioned so as to decouple the response of said output devices to their respective first and second representative signals.

* * * * *